(12) United States Patent
Piippo

(10) Patent No.: US 7,969,112 B2
(45) Date of Patent: Jun. 28, 2011

(54) STATOR RESISTANCE ADAPTATION IN SENSORLESS PMSM DRIVES

(75) Inventor: Antti Piippo, Espoo (FI)

(73) Assignee: ABB OY, Helsinki (FI)

( * ) Notice: Subject to any disclaimer, the term of this patent is extended or adjusted under 35 U.S.C. 154(b) by 454 days.

(21) Appl. No.: 12/081,365

(22) Filed: Apr. 15, 2008

(65) Prior Publication Data

US 2008/0265823 A1    Oct. 30, 2008

(30) Foreign Application Priority Data

Apr. 27, 2007  (EP) .................................... 07107115

(51) Int. Cl.
*G05B 11/36* (2006.01)
(52) U.S. Cl. .......................... 318/609; 318/632; 318/701
(58) Field of Classification Search .................. 318/609, 318/632, 701, 721, 719, 727, 800
See application file for complete search history.

(56) References Cited

U.S. PATENT DOCUMENTS

2005/0113052 A1* 5/2005 Rabinovich et al. ....... 455/194.2

OTHER PUBLICATIONS

Antti Piippo et al., "Analysis of an Adaptive Observer for Sensorless Control of PMSM Drives", Industrial Electronics Society, Nov. 6, 2005, pp. 1474-1479.
Matthew J. Corley et al., "Rotor Position and Velocity Estimation for a Salient-Pole Permanent Magnet Synchronous Machine at Standstill and High Speeds", IEEE Transaction on Industry Applications, vol. 34, No. 4, Aug. 4, 1998, pp. 784-789.
Antti Piippo et al., "Adaptive Observer Combined with HF Signal Injection for Sensorless Control of PMSM Drives", Electric Machine and Drives, May 15, 2005, pp. 674-681.

Antti Piippo et al., "Sensorless control of PMSM drives using a combination of voltage model and HF signal injection", Industry Applications Conference, vol. 2, Oct. 3, 2004, pp. 964-970.
Rusong Wu et al., "A Permanent Magnet Motor Drive Without a Shaft Sensor", vol. 27, No. 5, Sep./Oct. 1991, pp. 1005-1011.
Patrick L. Jansen et al., "Transducerless Position and Velocity Estimation in Induction and Salient AC Machines", IEEE Trans. Ind. Applicat., vol. 31, No. 2, Mar./Apr. 1995, pp. 240-247.
Kyeong-Hwa Kim et al., "Parameter Estimation and Control for Permanent Magnet Synchronous Motor Drive Using Model Reference Adaptive Technique", Proc. IEEE IECON'95, vol. 1, Nov. 1995, pp. 387-392.
Simon D. Wilson et al., "Resistance Estimation for Temperature Determination in PMSMs through Signal Injection", Proc. IEEE IEMDC'05, May 2005, pp. 735-740. Kyu-Wang Lee et al., "An Online Identification Method for Both Stator Resistance and Back-EMF Coefficient of PMSMs Without Rotational Transducers", IEEE Trans. Ind. Electron, vol. 51, No. 2, Apr. 2004, pp. 507-510.
Shinji Ichikawa et al., "Sensorless Control of Permanent-Magnet Synchronous Motors Using Online Parameter Identification Based on System Identification Theory", IEEE Trans. Ind. Electron, vol. 53, No. 2, Apr. 2006, pp. 363-372.
European Search Report dated Oct. 15, 2007.

* cited by examiner

*Primary Examiner* — Karen Masih
(74) *Attorney, Agent, or Firm* — Buchanan Ingersoll & Rooney PC

(57) ABSTRACT

A method of estimating stator resistance of a permanent magnet synchronous machine, when the permanent magnet synchronous machine is controlled with an inverter using a control system having an adaptive observer which is augmented with a signal injection, the adaptive observer having a stator resistance estimate ($\hat{R}_s$) as a parameter, in which method an error signal ($\epsilon$) is obtained from the signal injection, a speed correction term ($\omega_\epsilon$) is calculated from the error signal ($\epsilon$), the rotor position estimate is corrected using the speed correction term ($\omega_\epsilon$) in the adaptive observer, whereby the error signal ($\epsilon$) is driven to zero. The method comprises the step of correcting the value of the stator resistance estimate ($\hat{R}_s$) in the adaptive observer when the speed correction term ($\omega_\epsilon$) differs from zero.

9 Claims, 3 Drawing Sheets

STATOR RESISTANCE ADAPTATION IN SENSORLESS PMSM DRIVES

FIELD OF THE INVENTION

The present invention relates to a method for stator resistance adaptation, and more particularly to a method which can be used to correct the stator resistance estimate of a permanent magnet synchronous machine during the control of the machine.

BACKGROUND OF THE INVENTION

Permanent magnet synchronous machines (PMSMs) are used in many high performance applications. For vector control of PMSMs, information on the rotor position is required. In sensorless control, the rotor speed and position can be estimated by fundamental-excitation methods as in [1] R. Wu and G. R. Slemon, "A permanent magnet motor drive without a shaft sensor," IEEE Trans. Ind. Applicat., vol. 27, no. 5, pp. 1005-1011, September/October 1991 or signal injection methods as in [2] P. L. Jansen and R. D. Lorenz, "Transducerless position and velocity estimation in induction and salient AC machines," IEEE Trans. Ind. Applicat., vol. 31, no. 2, pp. 240-247, March/April 1995.

The above methods can also be combined by changing the estimation method as the rotor speed varies, as disclosed in [3] A. Piippo, M. Hinkkanen, and J. Luomi, "Sensorless control of PMSM drives using a combination of voltage model and HF signal injection," in Conf. Rec. IEEE-IAS Annu. Meeting, vol. 2, Seattle, Wash., October 2004, pp. 964-970. The fundamental-excitation methods used for sensorless control are based on models of the electrical subsystem, i.e. the permanent magnet machine. Hence, the electrical parameters are needed for the speed and position estimation as disclosed in [4] K.-H. Kim, S.-K. Chung, G.-W. Moon, I.-C. Baik, and M.-J. Youn, "Parameter estimation and control for permanent magnet synchronous motor drive using model reference adaptive technique," in Proc. IEEE IECON'95, vol. 1, Orlando, Fla., November 1995, pp. 387-392. The erroneous stator resistance results in an incorrect back-emf estimate, and consequently, impaired position estimation accuracy. The operation can also become unstable at low speeds in a loaded condition. The stator resistance depends on the motor temperature, and an adaptation scheme for the resistance is thus required to improve the estimation accuracy.

Several methods have been proposed to improve the performance of a PMSM drive by estimating the electrical parameters. An MRAS scheme is used for the on-line estimation of the stator resistance in sensorless control [4]. A DC-current signal is injected to detect the resistive voltage drop for the resistance estimation in document [5] S. Wilson, G. Jewell, and P. Stewart, "Resistance estimation for temperature determination in PMSMs through signal injection," in Proc. IEEE IEMDC'05, San Antonio, Tex., May 2005, pp. 735-740. The stator resistance and the permanent magnet flux are estimated in sensorless control in [6] K.-W. Lee, D.-H. Jung, and I.-J. Ha, "An online identification method for both stator resistance and back-emf coefficient of PMSMs without rotational transducers," IEEE Trans. Ind. Electron., vol. 51, no. 2, pp. 507-510, April 2004. The estimation in [6] is carried out using both the steady-state motor equations and response to an alternating current signal. However, the convergence of the estimated parameters to their actual values is not shown.

A method for extracting the resistance and the inductances of a salient PMSM from an extended EMF model is proposed in [7] S. Ichikawa, M. Tomita, S. Doki, and S. Okuma, "Sensorless control of permanent-magnet synchronous motors using online parameter identification based on system identification theory," IEEE Trans. Ind. Electron., vol. 53, no. 2, pp. 363-372, April 2006. Three electrical parameters are estimated simultaneously, but the experimental results depict vague behavior of the stator resistance estimate.

The problem relating to the known resistance estimation methods is the inaccuracy of the estimated resistance value. If the resistance is estimated prior to the use, its value will be accurate only at certain temperatures. It would thus be desirable to obtain an on-line resistance adaptation scheme that would keep the resistance estimate correct despite of the variations in the temperature.

BRIEF DESCRIPTION OF THE INVENTION

An object of the present invention is thus to provide a method so as to alleviate the above disadvantages. The object of the invention is achieved by a method which is characterized by what is stated in the independent claim. The preferred embodiments of the invention are disclosed in the dependent claims.

The method of the invention is based on the use of a speed-adaptive observer that is augmented with a high-frequency (HF) signal injection technique at low speeds. This kind of augmented observer is disclosed in [8] A. Piippo, M. Hinkkanen, and J. Luomi, "Analysis of an adaptive observer for sensorless control of PMSM drives," in Proc. IEEE IECON'05, Raleigh, N.C., November 2005, pp. 1474-1479. The stator resistance of the PMSM is estimated from a correction term obtained by the HF signal injection technique used in [8].

An advantage of the method of the invention is the accurate stator resistance estimate that is obtained in a simple manner from a signal already present in the control system. The more accurate stator resistance estimate enables a more accurate control of PMSM especially at the low speed region, where the influence of an erroneous stator resistance estimate has the greatest effect on the quality of the control.

BRIEF DESCRIPTION OF THE DRAWINGS

In the following the invention will be described in greater detail by means of preferred embodiments with reference to the attached drawings, in which.

DETAILED DESCRIPTION OF THE INVENTION

In the description, first a model for a permanent magnet synchronous machine is given. Then adaptive observer is shortly discussed together with high-frequency signal injection. The model and observer are both known per se, but since the method of the present invention is based on these, the short descriptions are provided for better understanding of the invention.

The PMSM is modeled in the d-q reference frame fixed to the rotor. The d axis is oriented along the permanent magnet flux, whose angle in the stator reference frame is $\theta_m$ in electrical radians. The stator voltage equation is $$u_s = R_s i_s + \dot{\psi}_s + \omega_m J \psi_s \quad (1)$$

where $u_s=[u_d \ u_q]^T$ is the stator voltage, $i_s=[i_d \ i_q]^T$ the stator current, $\psi_s=[\psi_d \ \psi_q]^T$ the stator flux, $R_s$ the stator resistance, $\omega_m=\dot{\theta}_m$ the electrical angular speed of the rotor, and $$J = \begin{bmatrix} 0 & -1 \\ 1 & 0 \end{bmatrix}$$

The Stator Flux is $$\omega_s = Li_s + \psi_{pm} \tag{2}$$

where $\psi_{pm}=[\psi_{pm} \ 0]^T$ is the permanent magnet flux and $$L = \begin{bmatrix} L_d & 0 \\ 0 & L_q \end{bmatrix}$$

is the inductance matrix, $L_d$ and $L_q$ being the direct- and quadrature-axis inductances, respectively. The electromagnetic torque is given by $$T_e = \frac{3p}{2} \psi_s^T J^T i_s \tag{3}$$

where p is the number of pole pairs.

An adaptive observer [8] is used for the estimation of the stator current, rotor speed, and rotor position. The speed and position estimation is based on the estimation error between two different models; the actual motor can be considered as a reference model and the observer—including the rotor speed estimate $\hat{\omega}_m$—as an adjustable model. An error term used in a speed adaptation mechanism is based on the estimation error of the stator current. The estimated rotor speed, obtained by the adaptation mechanism, is fed back to the adjustable model.

Figure 1:
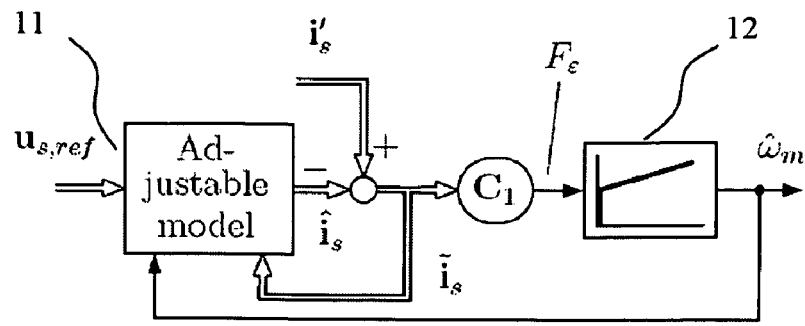
FIG. 1 is a block diagram of the adaptive observer.

The adaptive observer is formulated in the estimated rotor reference frame. The block diagram of the adaptive observer is shown in FIG. 1. The adjustable model 11 receives stator voltage reference $u_{s,ref}$ as an input and estimated electrical angular speed $\hat{\omega}_m$ and stator current error $\tilde{i}_s$ feedback.

The adjustable model is based on (1) and (2), and defined by $$\dot{\hat{\psi}}_s = u_{s,ref} - \hat{R}_s \hat{i}_s - \hat{\omega}_m J \hat{\psi}_s + \lambda \tilde{i}_s \tag{4}$$

where estimated quantities are marked by ^ and $u_{s,ref}$ is the stator voltage reference. The model also holds an estimate of the stator resistance as needed for the model. The estimate of the stator current and the estimation error of the stator current are $$\hat{i}_s = \hat{L}^{-1}(\hat{\psi}_s - \hat{\psi}_{pm}) \tag{5}$$

$$\tilde{i}_s = i'_s - \hat{i}_s \tag{6}$$

respectively, where measured quantities expressed in the estimated rotor reference frame are marked by '. The feedback gain matrix $\lambda$ is varied as a function of the rotor speed [8].

The speed adaptation is based on an error term $$F_\epsilon = C_1 \tilde{i}_s \tag{7}$$

where $C_1=[0 \ L_q]$, i.e., the current error in the estimated q direction, is used for adaptation. In FIG. 1 the estimate of the electrical angular speed of the rotor is obtained by a PI speed adaptation mechanism 12 defined by $$\dot{\hat{\omega}}_m = -k_p F_\epsilon - k_i \int F_\epsilon dt \tag{8}$$

where $k_p$ and $k_i$ are nonnegative gains. The gains are selected similarly as in [8]. The estimate $\hat{\theta}_m$ for the rotor position is obtained by integrating the rotor speed estimate $\hat{\omega}_m$.

The adaptive observer described above is augmented with an HF signal injection method to stabilize the speed and position estimation at low speeds. The method for coupling the HF signal injection to the adaptive observer is described in [8].

Document [9], M. Corley and R. D. Lorenz, "Rotor position and velocity estimation for a salient-pole permanent magnet synchronous machine at standstill and high speeds," IEEE Trans. Ind. Applicat., vol. 43, no. 4, pp. 784-789, July/August 1998, shows that by using the HF signal injection method with an alternating voltage as a carrier excitation signal, an error signal proportional to the position estimation error $\tilde{\theta}_m = \theta_m - \hat{\theta}_m$ is obtained. The error signal is used for correcting the estimated position by influencing the direction of the stator flux estimate of the adaptive model. The algorithm is given by $$\dot{\hat{\psi}}_s = u_{s,ref} - \hat{R}_s \hat{i}_s - (\hat{\omega}_m - \omega_\epsilon) J \hat{\psi}_s + \lambda \tilde{i}_s \tag{9}$$

and $$\omega_\epsilon = v_p \epsilon + v_i \int \epsilon dt \tag{10}$$

where $v_p$ and $v_i$ are the gains of the PI mechanism driving the error signal $\epsilon$ to zero and $\omega_\epsilon$ is the speed correction term.

At low speeds, the combined observer relies both on the signal injection method and on the adaptive observer. The influence of the HF signal injection is decreased linearly with increasing speed, reaching zero at a certain speed. At higher speeds, the estimation is based only on the adaptive observer.

The combined observer in (9) contains information that depends on the motor parameters but is not used for the speed and position estimation. At low-speed operation, the speed correction term $\omega_\epsilon$ obtained by the HF signal injection method compensates for the estimation errors of the adaptive observer that are caused by parameter errors. The motor parameters have thus errors if the speed correction term $\omega_\epsilon$ differs from zero in steady-state. According to the method of the invention, the stator resistance is adjusted by driving $\omega_\epsilon$ to zero.

At low speeds, the stator resistance estimate plays an important role in the speed and position estimation, especially in loaded condition. For obtaining the sensitivity of the correction to $\omega_\epsilon$ to the resistance error, the hybrid observer is investigated in steady state. The position estimation error is assumed zero because the HF signal injection method is in use.

In steady state, the permanent magnet motor and the adaptive observer can be written as $$u_s = R_s i_s + \omega_m J(Li_s + \psi_{pm}) \tag{11}$$

$$u_s = \hat{R}_s \hat{i}_s + (\hat{\omega}_m - \omega_\epsilon) J(L\hat{i}_s + \psi_{pm}) - \lambda \hat{i}_s \tag{12}$$

respectively. The estimated quantities are replaced by their actual values and the estimation errors, i.e. $\hat{x} = x - \tilde{x}$. When the stator voltage is eliminated by combining (11) and (12), we obtain $$R_s i_s + \omega_m J(Li_s + \psi_{pm}) = \tag{13}$$
$$(R_s - \tilde{R}_s)(i_s - \tilde{i}_s) + (\omega_m - \omega_\epsilon) J[L(i_s - \tilde{i}_s) + \psi_{pm}] - \lambda \tilde{i}_s$$

When it is assumed that the estimation errors and the speed correction term $\omega_\epsilon$ are small and their products are thus zero, the equation is reduced to $$(R_s I + \omega_m JL + \lambda)\tilde{i}_s = -\tilde{R}_s i_s - \omega_\epsilon J(Li_s + \psi_{pm}) \quad (14)$$

The q component of the current error is zero in steady state, because it is used for the speed adaptation. The observer gain is proportional to the rotor speed and is also neglected since low speeds are investigated. It is further assumed that the d component of the stator current is zero because it is considerably smaller than the q component. In component form, the result is $$\begin{bmatrix} R_s & -L_q i_q \\ \omega_m L_d & \psi_{pm} \end{bmatrix} \begin{bmatrix} \tilde{i}_d \\ \omega_\epsilon \end{bmatrix} = \tilde{R}_s \begin{bmatrix} 0 \\ -i_q \end{bmatrix} \quad (15)$$

The sensitivity of $\tilde{i}_d$ and $\omega_\epsilon$ to the stator resistance error is investigated. The variables $\tilde{i}_d$ and $\omega_\epsilon$ are solved from (15), and when $R_s \psi_{pm} \gg \omega_m L_d L_q i_q$ is also assumed, the result is $$\begin{bmatrix} \tilde{i}_d \\ \omega_\epsilon \end{bmatrix} = -\frac{1}{\psi_{pm}} \begin{bmatrix} \frac{L_q}{R_s} i_q^2 \\ i_q \end{bmatrix} \tilde{R}_s \quad (16)$$

It can be seen that both variables on the left hand side depend on the resistance error proportionally to the q-axis current. $\omega_\epsilon$ is selected for adaptation, because $\tilde{i}_d$ is proportional to the square of $i_q$. When using relative (or percentage) resistance error, we obtain $$\omega_\epsilon = -\frac{R_s i_q}{\psi_{pm}} \left( \frac{\tilde{R}_s}{R_s} \right) \quad (17)$$

where it can be seen that the stator resistance error $\tilde{R}_s$ is reflected to $\omega_\epsilon$ proportionally to the resistive voltage drop, i.e. the higher the q component of the stator current is, the greater value the speed correction term has in case the resistance error is not corrected. Equation (17) can thus be used for better understanding of the meaning of the speed correction term in the context of the present invention.

Figure 2:
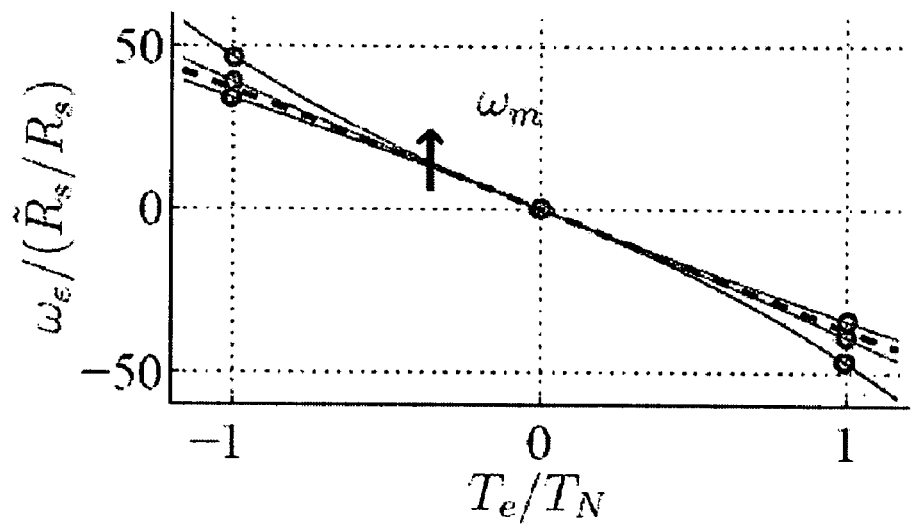
FIG. 2 shows the relationship between stator resistance error and speed correction term.

The relationship between the resistance error $\tilde{R}_s$ and the speed correction term is illustrated in FIG. 2. Solid lines show the calculated values without the assumptions made above (using equation (14)), dashed line shows calculated values with the above assumptions (using equation (17)), and the circles are simulated values in a few operating points.

The speed values used for the calculation and simulation are −0.067 p.u., 0 p.u., and 0.067 p.u. According to FIG. 2, the above assumptions result in only a small error in the gain.

In the present invention the stator resistance estimate included in the adaptive model is changed when the speed correction term differs from zero. The method of the invention estimates the stator resistance by driving the speed correction term to zero, and thus keeps the stator resistance estimate close to its actual value.

Figure 3:
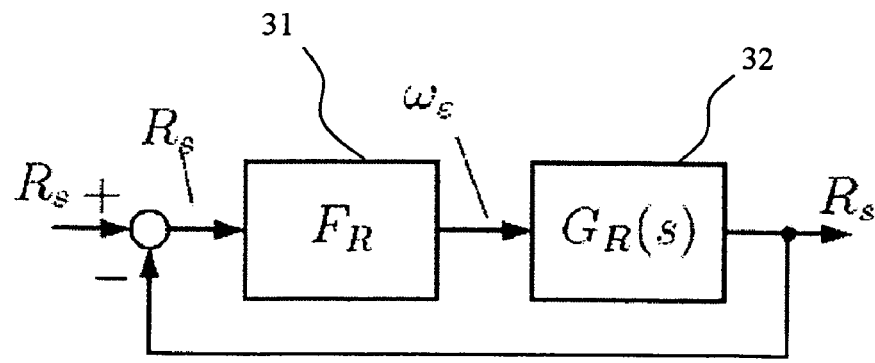
FIG. 3 shows a closed-loop system of the stator resistance adaptation.

According to a preferred embodiment of the invention, integration is used for the stator resistance adaptation from $\omega_\epsilon$, since (16) contains no dynamics. The closed-loop system of the stator resistance adaptation shown in FIG. 3 is investigated. The gain $$F_R = -i_q/\psi_{pm} \quad (18)$$

in block 31 of FIG. 3 corresponds to equation (16). $F_R$ defines the relationship between stator resistance estimation error and the speed correction term. Block 32 in FIG. 3 is the transfer function of the integrator used for adaptation.

$$G_R(s) = -k_R/s \quad (19)$$

When the adaptation is tuned such that the closed-loop system has a bandwidth $\alpha_R$, a design rule $$\alpha_R = i_q k_R/\psi_{pm} \quad (20)$$

is obtained. According to a preferred embodiment of the invention, the adaptation gain $k_R$ is changed according to the operating point. More specifically, the sign of the adaptation gain is changed with the current $i_q$ to maintain $\alpha_R$ positive.

Figure 4:
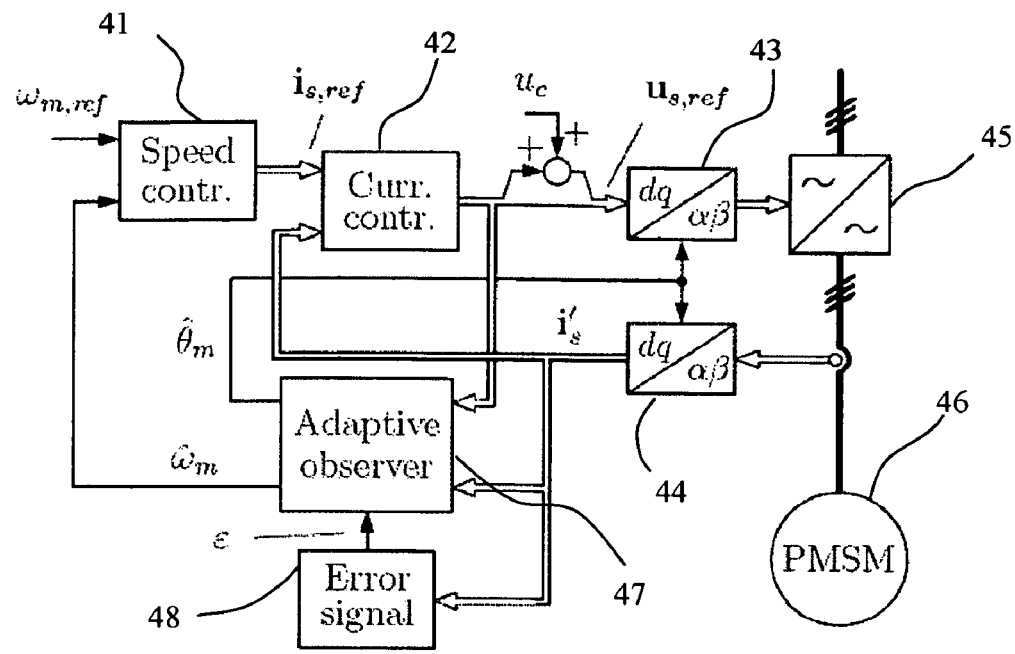
FIG. 4 shows a block diagram of the control system.

The method of the invention was investigated by means of simulations. FIG. 4 shows the block diagram of the control system comprising cascaded speed and current control loops. In FIG. 4 speed reference $\omega_{m,ref}$ is given to speed controller 41. The speed controller 41 also receives speed estimate $\hat{\omega}_m$ and outputs stator current reference $i_{s,ref}$ to the current controller 42. The current controller 42 also receives measured current $i'_s$ via co-ordinate transformation block 44.

The HF-signal $u_c$ is injected to the output of the current controller 42 for obtaining stator voltage reference $u_{s,ref}$ that is fed to a frequency converter 45 via co-ordination transformation block 43. Frequency converter in turn controls the PMSM 46.

As mentioned above, the stator current $i'_s$ is measured and fed to error signal generation block 48 and to adaptive observer 47. The error signal generation block 48 outputs the error signal $\epsilon$ to the adaptive observer 47. The observer produces estimates for the speed of the machine $\hat{\omega}_m$ and rotor position $\hat{\theta}_m$. The position estimate is in turn used in co-ordinate transformation blocks 43 and 44.

The method of the invention is implemented in the adaptive observer 47 which holds the parameter values. Value of the stator estimate is updated according to the method as long as the speed correction term differs from zero.

The data of the six-pole interior-magnet PMSM (2.2 kW, 1500 rpm) used in the simulations are given in Table 1. The base values for voltage, current, and angular speed are defined as $U_B = mt;epmrl;\sqrt{2/3}rlxmxU_N$, $I_B = \sqrt{2}I_N$, and $\omega_B = 2\pi f_N$, respectively. The electromagnetic torque is limited to 22 Nm, which is 1.57 times the nominal torque $T_N$. The high-frequency carrier excitation signal has a frequency of 833 Hz and an amplitude of 40 V. The HF signal injection is used below speed 0.13 p.u. and the bandwidth $\alpha_R$ has a maximum value of approximately 0.01 p.u. Other parameters of the control system are given in Table 2.

Figure 5:
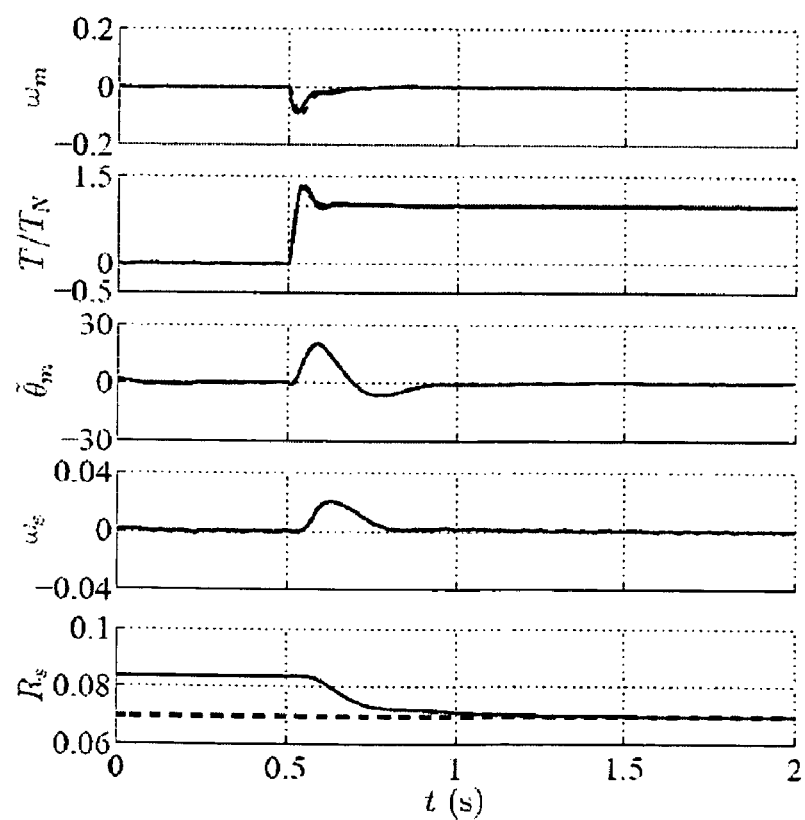
FIGS. 5 and 6 show simulation results.

Except the stator resistance, the parameter values used in the controller were equal to those of the motor model. FIG. 5 shows results obtained at the zero speed reference. The first subplot shows the electromagnetic speed of the rotor (solid), its estimate (dashed), and its reference (dotted). The second subplot shows the load torque reference (dotted), the electromagnetic torque (solid), and its estimate (dashed). The third subplot shows the estimation error of the rotor position. The fourth subplot shows the speed correction term obtained by the HF signal injection method and the last subplot shows the stator resistance (dotted) and its estimate (solid).

The stator resistance estimate is set 20% higher than the stator resistance in the motor model at the beginning of the simulation. A nominal load torque step is applied at t=0.5 s. The stator resistance estimate starts to approach the actual value, and at t=2 s the resistance error is negligible. The speed and position estimation errors after applying the load torque are due to the stator resistance estimation error.

Figure 6:
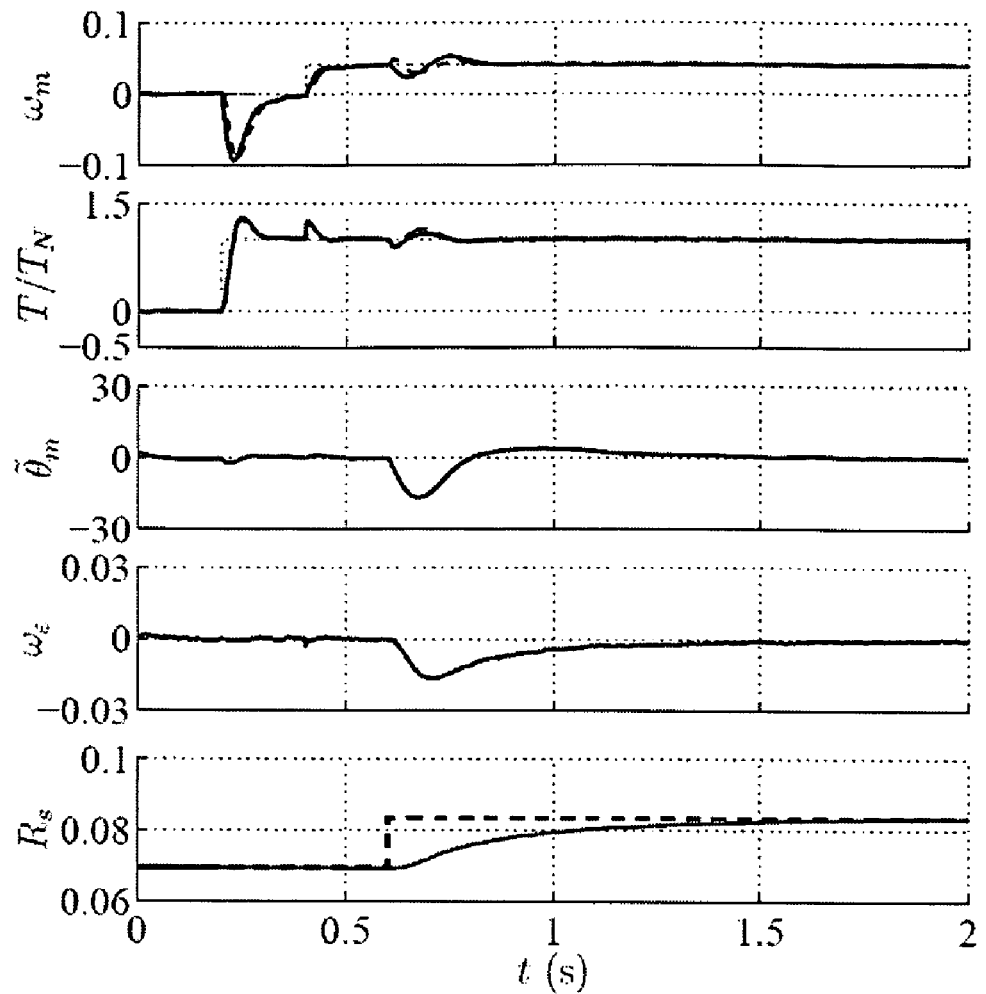

Results showing response to a changing stator resistance are depicted in FIG. 6. The explanations of the subplots and curves are as in FIG. 5. A nominal load torque step is applied at t=0.2 s, a speed reference step of 0.04 p.u. is applied at t=0.4 s, and the stator resistance in the motor model is increased by 20% at t=0.6 s. When the resistance changes, estimation errors appear in the rotor speed and position. The estimation errors are compensated for by the signal injection method, and the stator resistance estimate is close to its actual value at t=2 s. By comparing FIGS. 5 and 6, it is obvious that the stator resistance error impairs the position estimation accuracy when a load torque step is applied.

According to another embodiment, the value of stator resistance estimate $\hat{R}_s$ is corrected using a PI-controller for driving the speed correction term $\omega_\epsilon$ to zero. The PI-controller of the embodiment thus changes the value or stator resistance estimate to change the speed correction term towards zero.

It is also clear that other ways of driving the speed correction term to zero so as to correct the stator resistance exists. These other ways may include more complicated controllers and non-linear functions.

The method of the invention reduces the estimation errors in sensorless PMSM drives. The stator resistance adaptation disclosed has a good performance at low speeds where the precise stator resistance value is needed for estimating the rotor speed and position. The convergence of the stator resistance obtained with the method of the invention is fast enough to compensate for the effects caused by the temperature-dependent stator resistance.

It should be noted that the above examples are for better understanding of the invention. The control system presented above is also only one possible way of implementing the method of the invention. Also the numerical values presented above are only examples of simulations carried out.

It will be obvious to a person skilled in the art that the inventive concept can be implemented in various ways. The invention and its embodiments are not limited to the examples described above but may vary within the scope of the claims.

TABLE 1

Motor Data

| | |
|---|---|
| Nominal voltage $U_N$ | 370 V |
| Nominal current $I_N$ | 4.3 A |
| Nominal frequency $f_N$ | 75 Hz |
| Nominal torque $T_N$ | 14.0 Nm |
| Stator resistance $R_s$ | 3.59 Ω |
| Direct-axis inductance $L_d$ | 36.0 mH |
| Quadrature-axis inductance $L_q$ | 51.0 mH |
| Permanent magnet flux $\psi_{pm}$ | 0.545 Vs |
| Total moment of inertia | 0.015 kgm$^2$ |

TABLE 2

Control System Parameters

| | |
|---|---|
| Current controller bandwidth | 2π400 rad/s |
| Speed controller bandwidth | 2π5 rad/s |
| Speed adaptation bandwidth | 2π50 rad/s |

The invention claimed is:

1. A method of estimating stator resistance of a permanent magnet synchronous machine, when the permanent magnet synchronous machine is controlled with an inverter using a control system having an adaptive observer which is augmented with a signal injection, the adaptive observer having a stator resistance estimate ($\hat{R}_s$) as a parameter, the method comprising
   obtaining an error signal ($\epsilon$) from the signal injections;
   calculating a speed correction term ($\omega_\epsilon$) from the error signal ($\epsilon$);
   correcting a rotor position estimate using the speed correction term ($\omega_\epsilon$) in the adaptive observer, whereby the error signal ($\epsilon$) is driven to zero; and
   correcting the value of the stator resistance estimate ($\hat{R}_s$) in the adaptive observer when the speed correction term ($\omega_\epsilon$) differs from zero.

2. A method according to claim 1, wherein the step of correcting the value of the stator resistance estimate comprises a step in which the speed correction term ($\omega_\epsilon$) is integrated to zero, thereby adapting the resistance estimate ($\hat{R}_s$) to correspond with an actual stator resistance ($R_s$).

3. A method according to claim 2, wherein the integration of the speed correction term to zero comprises using an adaptation gain.

4. A method according to claim 3, wherein the sign of a the adaptation gain is changed according to the sign of q-component of a stator current ($i_q$).

5. A method according to claim 1, wherein the value of speed correction term ($\omega_\epsilon$) is the negation of the product of a resistance estimation error and a q component of a stator current divided by a permanent magnet flux, whereby a transfer function for driving the speed correction term to zero and for stator resistance adaptation is $G_R(s)=-k_R/s$, and the adaptation is tuned such that $\alpha_R=i_q k_R/\psi_{pm}$, where $k_R$ is the adaptation gain, s is integration operator, $\alpha_R$ is the bandwidth of the closed-loop system which is kept positive, $i_q$ is the q component of the stator current, and $\psi_{pm}$ is the permanent magnet flux of the permanent magnet synchronous machine.

6. A method according to claim 1, wherein the step of correcting the value of the stator resistance estimate comprises a step in which a PI-controller is used for controlling the speed correction term to zero thereby adapting the resistance estimate ($\hat{R}_s$) to correspond with an actual stator resistance ($R_s$).

7. A method according to claim 2, wherein the value of speed correction term ($\omega_\epsilon$) is the negation of the product of a resistance estimation error and a q component of a stator current divided by a permanent magnet flux, whereby the transfer function for driving the speed correction term to zero and for stator resistance adaptation is $G_R(s)=-k_R/s$, and the adaptation is tuned such that $\alpha_R=i_q k_R/\psi_{pm}$, where $k_R$ is the adaptation gain, s is integration operator, $\alpha_R$ is the bandwidth of the closed-loop system which is kept positive, $i_q$ is the q component of the stator current, and $\psi_{pm}$ is the permanent magnet flux of the permanent magnet synchronous machine.

8. A method according to claim 3, wherein the value of speed correction term ($\omega_\epsilon$) is the negation of the product of a resistance estimation error and a q component of a stator current divided by a permanent magnet flux, whereby the transfer function for driving the speed correction term to zero and for stator resistance adaptation is $G_R(s)=-k_R/s$, and the adaptation is tuned such that $\alpha_R=i_q k_R/\psi_{pm}$, where $k_R$ is the adaptation gain, s is integration operator, $\alpha_R$ is the bandwidth of the closed-loop system which is kept positive, $i_q$ is the q component of the stator current, and $\psi_{pm}$ is the permanent magnet flux of the permanent magnet synchronous machine.

9. A method according to claim 4, wherein the value of speed correction term ($\omega_\epsilon$) is the negation of the product of a resistance estimation error and a q component of the stator current divided by a permanent magnet flux, whereby the transfer function for driving the speed correction term to zero and for stator resistance adaptation is $G_R(s)=-k_R/s$, and the adaptation is tuned such that $\alpha_R=i_q k_R/\psi_{pm}$, where $k_R$ is the adaptation gain, s is integration operator, $\alpha_R$ is the bandwidth of the closed-loop system which is kept positive, $i_q$ is the q component of the stator current, and $\psi_{pm}$ is the permanent magnet flux of the permanent magnet synchronous machine.

\* \* \* \* \*